Dec. 9, 1958    R. C. GADDIS    2,863,578
BULK MATERIALS HANDLING BODY
Filed Sept. 21, 1956    5 Sheets-Sheet 1
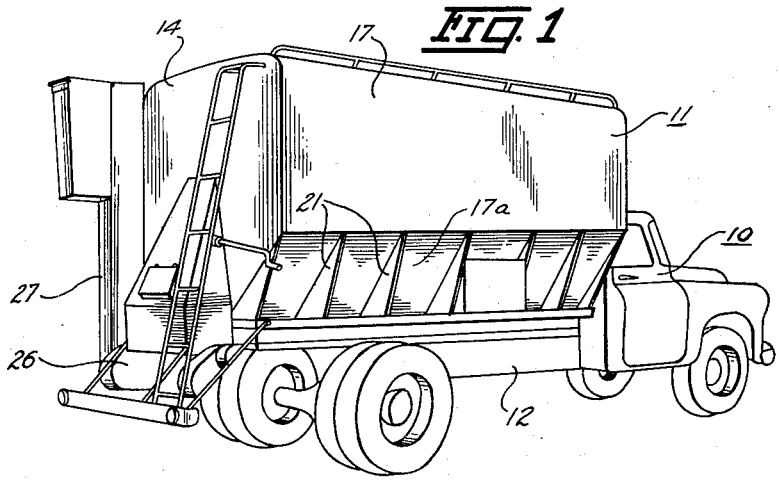
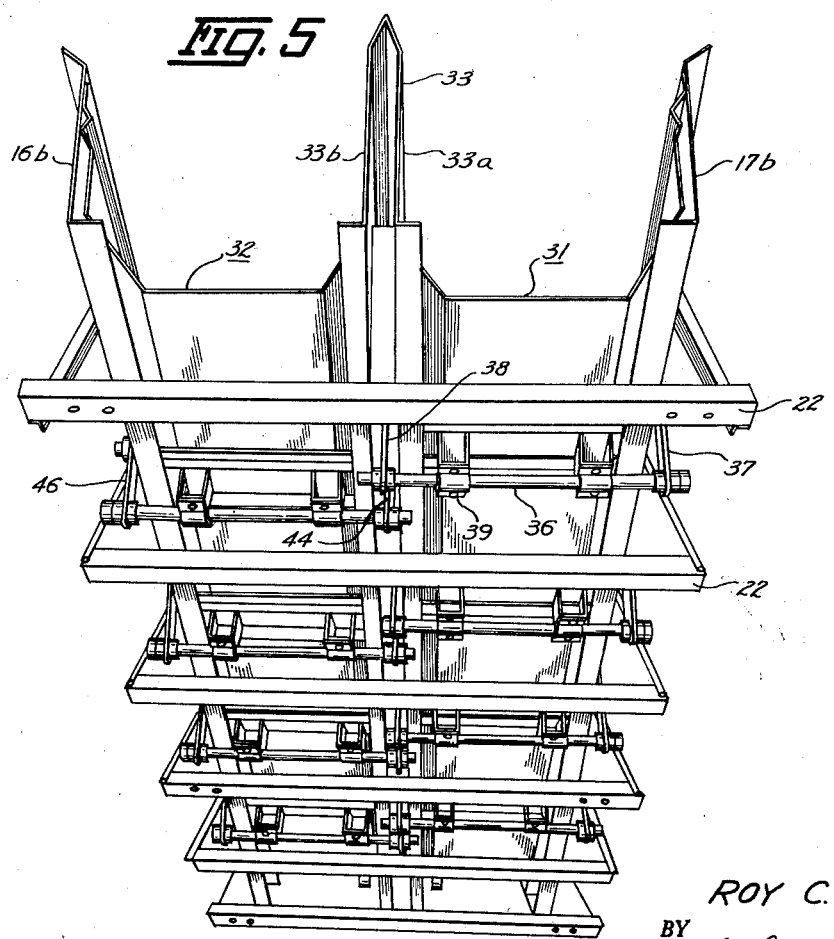
INVENTOR.
ROY C. GADDIS
BY
R. Donald Pitts
AGENT.

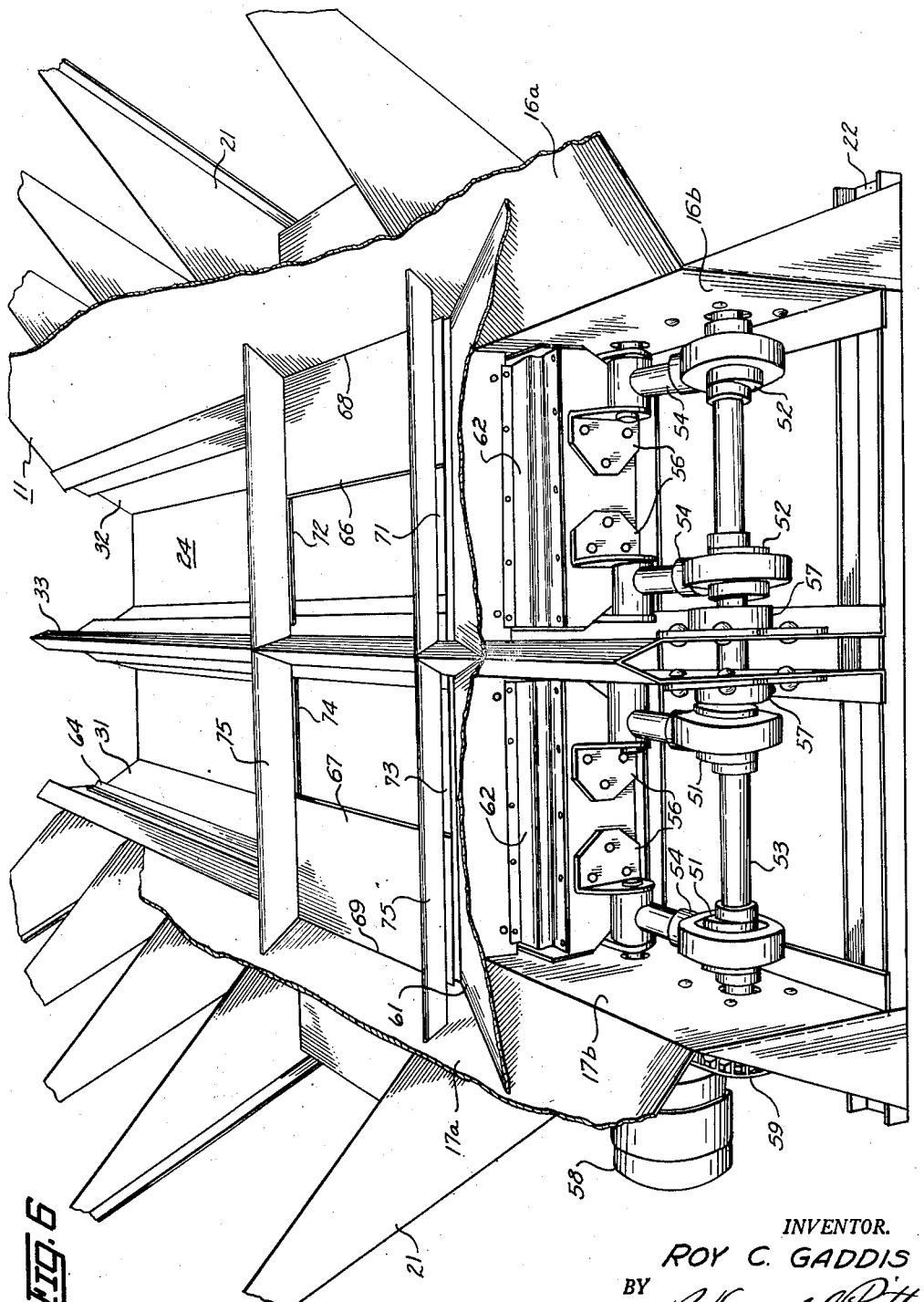

Dec. 9, 1958 R. C. GADDIS 2,863,578
BULK MATERIALS HANDLING BODY
Filed Sept. 21, 1956 5 Sheets-Sheet 3

INVENTOR.
ROY C. GADDIS
BY
R. Donald Pitts
AGENT

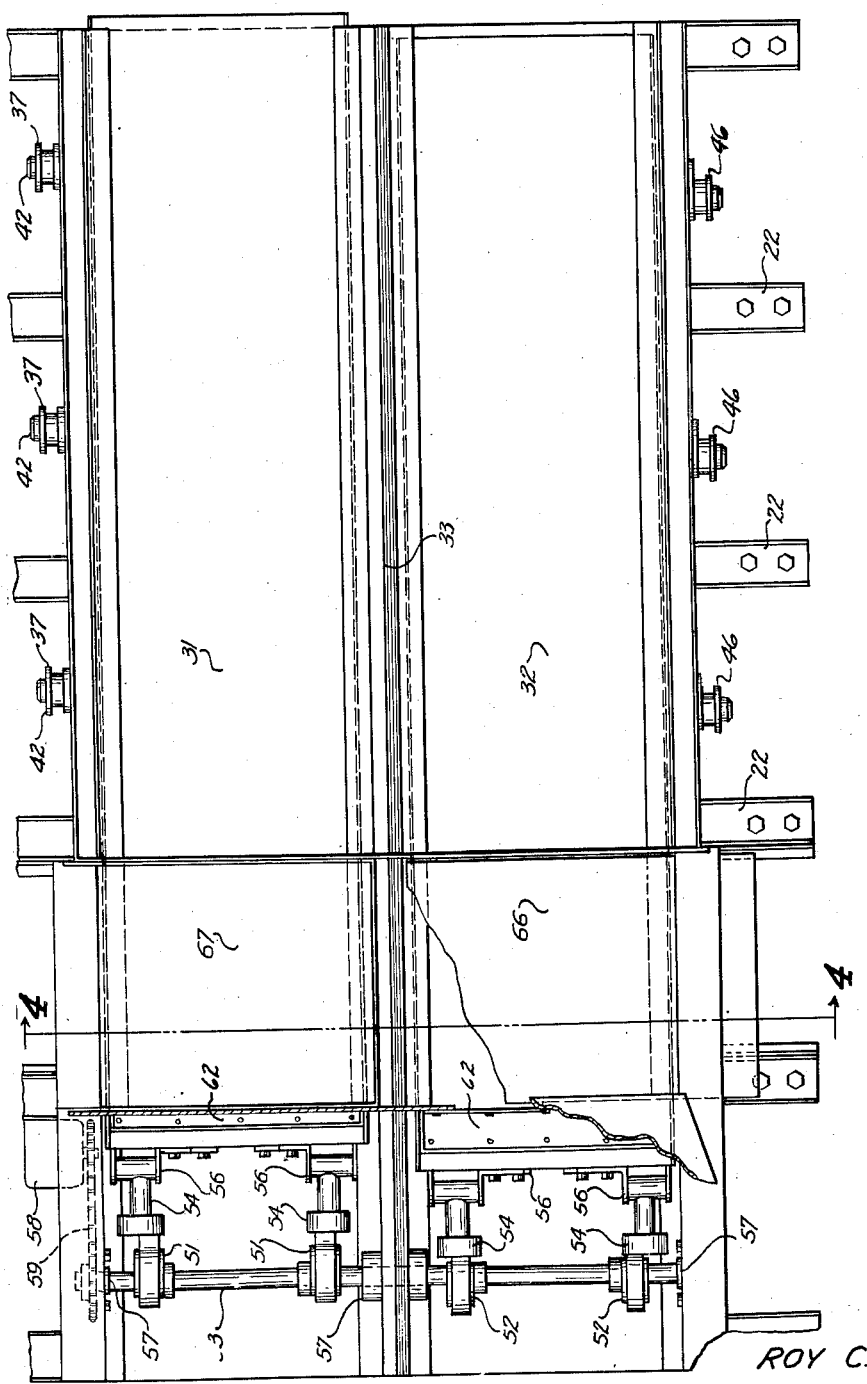

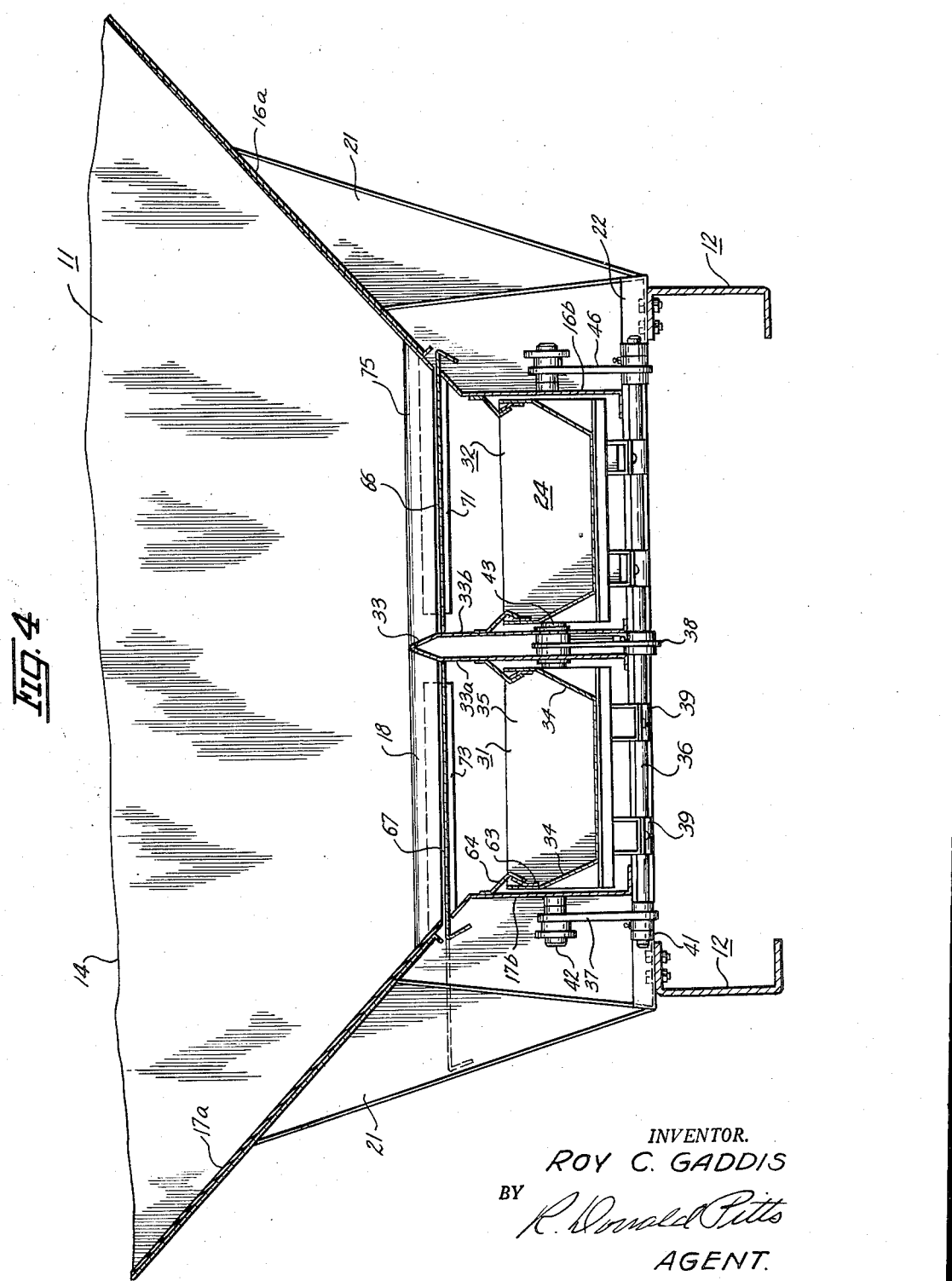

United States Patent Office 2,863,578
Patented Dec. 9, 1958

2,863,578

BULK MATERIALS HANDLING BODY

Roy C. Gaddis, Cedar Rapids, Iowa

Application September 21, 1956, Serial No. 611,293

1 Claim. (Cl. 214—83.3)

This invention relates to bulk materials handling bodies for vehicles and more specifically to improvements in conveying mechanisms for unloading such vehicle bodies.

Hopper-type vehicle bodies have been developed for the handling of most kinds of granular, or comminuted materials, and grain as well as mucky or somewhat sticky materials such as mixed feeds and the like. Many types of mechanisms have been employed for discharging or emptying such vehicles for example, screw-type conveyors, belt-type conveyors, drag-link type chain conveyors and a group of oscillatory, vibratory or shaker-type conveyors. The present invention is concerned primarily with improvements in the last mentioned general class of conveying mechanisms in hopper-type vehicles.

It is a general object of my invention to provide improved means for unloading bulk materials from hoppers or from vehicle bodies.

A primary object of the invention is the provision of improved means for handling materials such as molasses-mixed feeds and the like which have, in the past, been considered difficult to handle.

Another primary object of the invention is the provision of means for eliminating or substantially reducing the objectionable and frequently destructive vibrations set up in a vehicle and vehicle body by oscillating or shaker type conveyors.

Still another object of the invention is the provision of an improved hopper-conveyor structure.

Other and further features and objects of the invention will be more apparent to those skilled in the art upon a careful examination of the following specifications and attached drawings in which is disclosed a single exemplary embodiment of the invention.

In the drawings:

Figure 1 is a general view in perspective of a vehicle embodying a bulk materials handling body and conveying mechanism constructed in accordance with my invention.

Figure 3 is a view in horizontal section taken along the line 3—3 of Figure 2 and illustrating the conveyor pans.

Figure 4 is a view in vertical transverse section taken along the line 4—4 of Figure 3.

Figure 5 is a fragmentary view in perspective of the underside of the conveyor structure with the hopper walls of the vehicle body removed, and Figure 6 is a showing of the same portion of the device as viewed from above and from its forward end.

Figure 2:
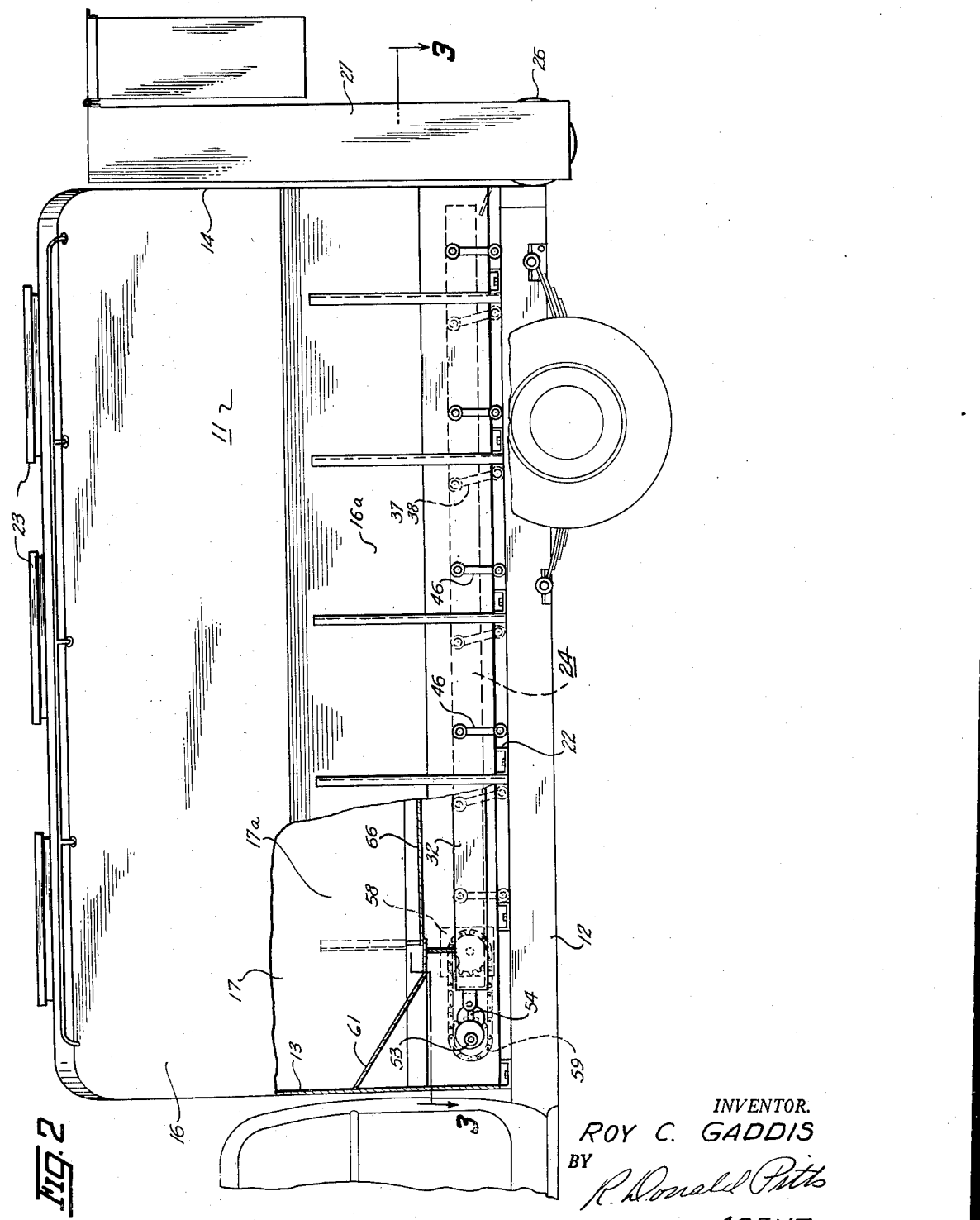
Figure 2 is a view in side elevation, of the device of Figure 1, with portions thereof broken away to better illustrate the structure.

Referring now to these drawings and in particular to Figures 1 and 2 thereof in which a vehicle, indicated generally at 10 carries a hopper-type, bulk materials handling body indicated generally at 11 upon the vehicle chassis 12. The body 11 includes generally vertical, forward and rear end-walls 13 and 14 respectively, joined together by side walls 16 and 17 the lower portions of which converge inwardly as at 16a and 17a to provide a longitudinally extending discharge opening 18 in the bottom of the hopper as best shown in Figures 4, 5 and 6. The lower edges of the sloping side walls 16a and 17a terminate in vertical portions 16b and 17b to form an enclosure for the hopper conveyor to be described hereinafter. The sloping sides of the hopper are preferably reinforced by and secured by the gussets 21 to the transverse frame members 22, those members being in turn bolted or otherwise secured to the vehicle chassis 12. The top of the hopper may be closed and provided with a loading hatch 23 as shown in Figure 2.

A hopper conveyor unit 24 mounted below the discharge opening 18 is adapted to receive material from the hopper and deliver it rearwardly to the discharge conveyors 26 and 27. The specific structure of these conveyor members 26 and 27 forms no part of the present invention and accordingly will not be described in any great detail.

The hopper conveyor unit 24 includes dual conveyor troughs or pans 31 and 32 disposed below the hopper and between the vertical side wall portions 16b and 17b. The pans are separated by a splitter guard 33 which extends longitudinally and centrally of the hopper discharge opening. These pans are preferably of the shape best shown in Figure 4, having inwardly sloping side walls 34 and a closed forward end 35, the rear or discharge end of each pan being open.

The pans 31 and 32 are supported independently for forward and aft oscillating movement on a plurality of transverse shafts 36 supported by links 37 and 38. The shafts are attached by means of saddles 39 to the underside of the pans, the links 37 and 38 being pivotally attached at the outer ends thereof and secured by collars 41; the upper ends of the links 37 and 38 being pivotally mounted on pins 42 and 43 respectively. The pins 42 are secured, as by welding, to the outer face of the lower vertical portions of the walls 17b, and the pins 43 are secured in alignment with the pins 42 but between the double walls 33a and 33b of the splitter guard 33. The links 37 and 38 supporting pan 31 are staggered or offset relative to the links 44 and 46 supporting pan 32 so as to avoid interference between the inner links 38 and 44.

The pans are arranged to be driven or oscillated by means of eccentrics 51—51 and 52—52 mounted on a transverse drive or eccentric shaft 53 and operatively connected to the pans by connecting rods 54. These rods are pivotally secured by the brackets 56 to the closed end walls 35—35 of the pans. The eccentric drive shaft 53 is supported in bearings 57 and driven by means of a motor 58 through a chain and sprocket drive indicated at 59. The motor may be hydraulic or any other suitable type or the eccentric shaft may be driven from the power take-off of the vehicle through any conventional mechanism.

It should be noted that the pair of eccentrics 51 driving the conveyor pan 31 are secured to the eccentric shaft 53 at 180 degrees to the eccentrics 52 which drive the pan 32.

The drive is so positioned or adjusted that the supporting links 37, 38, 44 and 46 are closer to a relatively vertical position when the pans are in their forwardmost position (see pan 32 in Figure 3 and links 46 in Figure 2) than when the pans are in their rearmost position (see dotted line position of links 37 and 38 in Figure 2). Thus, most any material such as grain, feed, granulated or crushed materials such as sand or rock and the like will be moved rearwardly toward the discharge ends of the pans during continued oscillation of the pans by the eccentric drivers 51 and 52.

Material dropped from the ends of the pans falls into the transverse conveyor 26 which discharges, in turn, into the discharge conveyor 27.

The conveyor pans are preferably shorter than the hopper to permit the eccentric drive shaft 53, connecting rods and associated equipment to be enclosed within the lower forward portion of the hopper. A floor member 61 sloping rearwardly and downwardly from the front wall 13 of the hopper to a point beyond the front ends of the conveyor pans provides a cover for the driving mechanism. Flexible or pleated boots or shields 62 are affixed between the rear edge of this cover and the upper edges of the pan forward ends 35.

The longitudinal edges of the pans are each sealed in a somewhat similar manner but with sliding guards or shields as best shown in Figure 4. Flexible strips 63, of leather, rubber or the like, wipe the inner face of each side wall 34 of each pan. These wiper strips are bolted or cemented to offset metal guards 64 which are, in turn, bolted to the inner faces of the hopper side walls 17b and 16b.

Transverse, horizontal, sliding panels 66 and 67 are preferably provided to permit the conveyor pans to be relieved of a portion of the weight of the load in the hopper. These sliding panels are received in slots 68 and 69 respectively in the lower portion of each sloping side wall 16a and 17a. The edges of each sliding panel are supported by transverse slides 71, 72, 73 and 74 which are preferably covered by guards 75.

It is believed that the operation of the device is generally self explanatory. However, actuation of the dual conveyor pans by eccentric drivers operating at angular spacings of 180 degrees results in vibrations set up by movement of one conveyor pan being substantially offset or nullified by opposite vibrations set up by the other conveyor pan.

Although I have shown and described a specific embodiment of my invention, it should be understood that modifications thereof may be made by those skilled in the art. For example the supporting structure for the conveyor pans may be other than the pivotally supported links shown. The means for imparting motion to the conveyor pans may be eccentric weights instead of cams and connecting rods or any other suitable mechanism.

Also, the conveyor pans may be more than two in number. For example, three pans may be mounted for continuous operation but at angular spacings of 120 degrees.

Such modifications may be made without departing from the spirit and scope of the invention as set forth in the following claim.

I claim as my invention:

In a bulk materials handling body, a hopper having inwardly and downwardly converging side walls terminating at their lower edges with substantially vertical flange portions to form an elongated discharge opening, a splitter guard extending longitudinally and centrally of said opening and having spaced flange portions, conveyor pans having upwardly extending side walls disposed between the vertical flange portions and the spaced flange portions, shields affixed to the said flange portions sloping inwardly and downwardly over the adjacent side walls of the pans to prevent leakage of material between the walls of the pans and the said flanged portions, a plurality of support links pivotally secured to the pans at their lower ends and pivotally supported at their upper ends between the spaced flange portions of the splitter and adjacent the outer surface of the said vertical flange portions of the hopper, and means for alternately reciprocating the conveyor pans in a discharge direction.

References Cited in the file of this patent

UNITED STATES PATENTS

| | | |
|---|---|---|
| 1,381,869 | Graham | June 14, 1921 |
| 1,420,360 | Barbeau et al. | June 20, 1922 |
| 1,519,293 | Clark | Dec. 16, 1924 |
| 2,500,293 | O'Connor | Mar. 14, 1950 |
| 2,589,968 | Schemm | Mar. 18, 1952 |
| 2,626,068 | Bradshaw | Jan. 20, 1953 |
| 2,739,722 | Joy | Mar. 27, 1956 |